(12) United States Patent
Chan et al.

(10) Patent No.: US 9,306,939 B2
(45) Date of Patent: Apr. 5, 2016

(54) AUTHORIZATION TOKEN CACHE SYSTEM AND METHOD

(71) Applicant: Oracle International Corporation, Redwood City, CA (US)

(72) Inventors: Daniel Chan, San Jose, CA (US); Sunil Kunisetty, Fremont, CA (US)

(73) Assignee: Oracle International Corporation, Redwood, CA (US)

( * ) Notice: Subject to any disclaimer, the term of this patent is extended or adjusted under 35 U.S.C. 154(b) by 175 days.

(21) Appl. No.: 14/292,646

(22) Filed: May 30, 2014

(65) Prior Publication Data

US 2015/0350186 A1    Dec. 3, 2015

(51) Int. Cl.
*H04L 29/06* (2006.01)
*H04L 29/08* (2006.01)

(52) U.S. Cl.
CPC .......... *H04L 63/083* (2013.01); *H04L 67/2842* (2013.01)

(58) Field of Classification Search
CPC .............................. H04L 63/083; H04L 67/10
See application file for complete search history.

(56) References Cited

U.S. PATENT DOCUMENTS

| 9,088,564 B1* | 7/2015 | Hobson | H04L 63/0815 |
| 2012/0144501 A1* | 6/2012 | Vangpat | H04L 63/108 726/28 |
| 2014/0040993 A1* | 2/2014 | Lorenzo | G06F 21/41 726/4 |
| 2014/0068746 A1* | 3/2014 | Gonzalez Martinez | H04L 63/0884 726/9 |
| 2014/0230023 A1* | 8/2014 | Parks | G06F 21/41 726/4 |
| 2014/0244584 A1* | 8/2014 | Song | G06F 17/30345 707/627 |
| 2014/0337914 A1* | 11/2014 | Canning | H04L 63/10 726/1 |
| 2015/0100660 A1* | 4/2015 | Flack | H04L 67/2842 709/213 |
| 2015/0150109 A1* | 5/2015 | Bocanegra | H04L 63/0807 726/9 |

* cited by examiner

*Primary Examiner* — Hadi Armouche
*Assistant Examiner* — Cheng-Feng Huang
(74) *Attorney, Agent, or Firm* — Polsinelli PC

(57) ABSTRACT

A system includes one or more processors to request access tokens from a token service computer, cache the access tokens and related information in a token cache, transmit the access tokens with a resource request to a resource server, and receive requested resources in response to the resource request. The resource server transmits representations of requested resources to computing devices having valid tokens. The access tokens and related information including credentials information and token metadata are stored in the token cache.

21 Claims, 7 Drawing Sheets

AUTHORIZATION TOKEN CACHE SYSTEM AND METHOD

TECHNICAL FIELD

The present disclosure generally relates to token cache systems and methods. Access tokens and related information including credentials information and token metadata are stored in the token cache.

BACKGROUND

As the Internet has matured, web services and web applications have proliferated. Some of the growth is based on the growth and rapid development of scalable remote computing services that are easily configurable and offered at low cost. Rather than build a server farm or obtain computing system infrastructure, users, whether individuals, companies, universities, or the like, may host their web services using fast and inexpensive remote computing resources instead often hosted and managed by third parties. Users may purchase use of computing resources, including physical and virtual computer processing entities, providing units of computing power, storage, and databases on demand. The units of computing power may provide access to protected resources and data stored in the storage and/or databases.

Web services utilize a variety of security measures to ensure that clients accessing protected resources are authenticated and authorized to access the protected resources. There are a variety of different ways to provide secure access to protected resources, and this presents a problem for clients. In one example, a client may request access and data from hundreds of web services, each web service having a different way of providing secure access. The client must identify the specific security measures that are used for each web service. Conventional methods of client access to protected resources provided by web services have reached their limits and may not be sustainable.

SUMMARY

Briefly described, and according to one embodiment, aspects of the present disclosure generally relate to token cache systems and methods. In one aspect, an application or service comprises a token client and/or the application or service communicates with the token client. The token client comprises a token cache having one or more access tokens, one or more credentials information, and one or more token metadata. The token client obtains the one or more access tokens from a token service computer using the one or more credentials information and the one or more token metadata. The token client transmits a request for protected resources including an access token to a resource server and receives a representation of the protected resources. The token cache allows the application or service to obtain refreshed access tokens and adapt to changes in the credentials information and invalidated access tokens and/or expired access tokens.

According to one aspect, a system includes one or more processors to send an initialization message from an application to a token client, the initialization message comprising credentials information and token metadata, cache the credentials information and the token metadata in a token cache and return a session identifier that maps to a cache key to retrieve the token metadata and the credentials information, wherein the token metadata comprises at least one service property used for obtaining an access token from a token service, send a first access token request based on the credentials information and the token metadata, receive a first access token response and retrieve a first access token from the access token response using the token metadata, cache the first access token in the token cache by associating the first access token with the cache key, send a resource request for protected resources, receive a resource response from a resource server, the resource response having a representation of the protected resources, and send, based on the resource response, the representation of the protected resources.

According to another aspect, a method includes sending, by at least one processor, an initialization message from an application to a token client, the initialization message comprising credentials information and token metadata, caching, by the at least one processor, the credentials information and the token metadata in a token cache and returning a session identifier that maps to a cache key to retrieve the token metadata and the credentials information, wherein the token metadata comprises at least one service property used for obtaining an access token from a token service, sending, by the at least one processor, a first access token request based on the credentials information and the token metadata, receiving, by the at least one processor, a first access token response and retrieving a first access token from the access token response using the token metadata, caching, by the at least one processor, the first access token in the token cache by associating the first access token with the cache key, sending, by the at least one processor, a resource request for protected resources, receiving, by the at least one processor, a resource response from a resource server, the resource response having a representation of the protected resources, and sending, based on the resource response, by the at least one processor, the representation of the protected resources.

According to an additional aspect, a non-transitory computer-readable medium includes instructions stored thereon that, when executed by at least one processor, cause the at least one processor to perform operations comprising sending an initialization message from an application to a token client, the initialization message comprising credentials information and token metadata, caching the credentials information and the token metadata in a token cache and returning a session identifier that maps to a cache key to retrieve the token metadata and the credentials information, wherein the token metadata comprises at least one service property used for obtaining an access token from a token service, sending a first access token request based on the credentials information and the token metadata, receiving a first access token response and retrieving a first access token from the access token response using the token metadata, caching the first access token in the token cache by associating the first access token with the cache key, sending a resource request for protected resources, receiving a resource response from a resource server, the resource response having a representation of the protected resources, and sending, based on the resource response, the representation of the protected resources.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
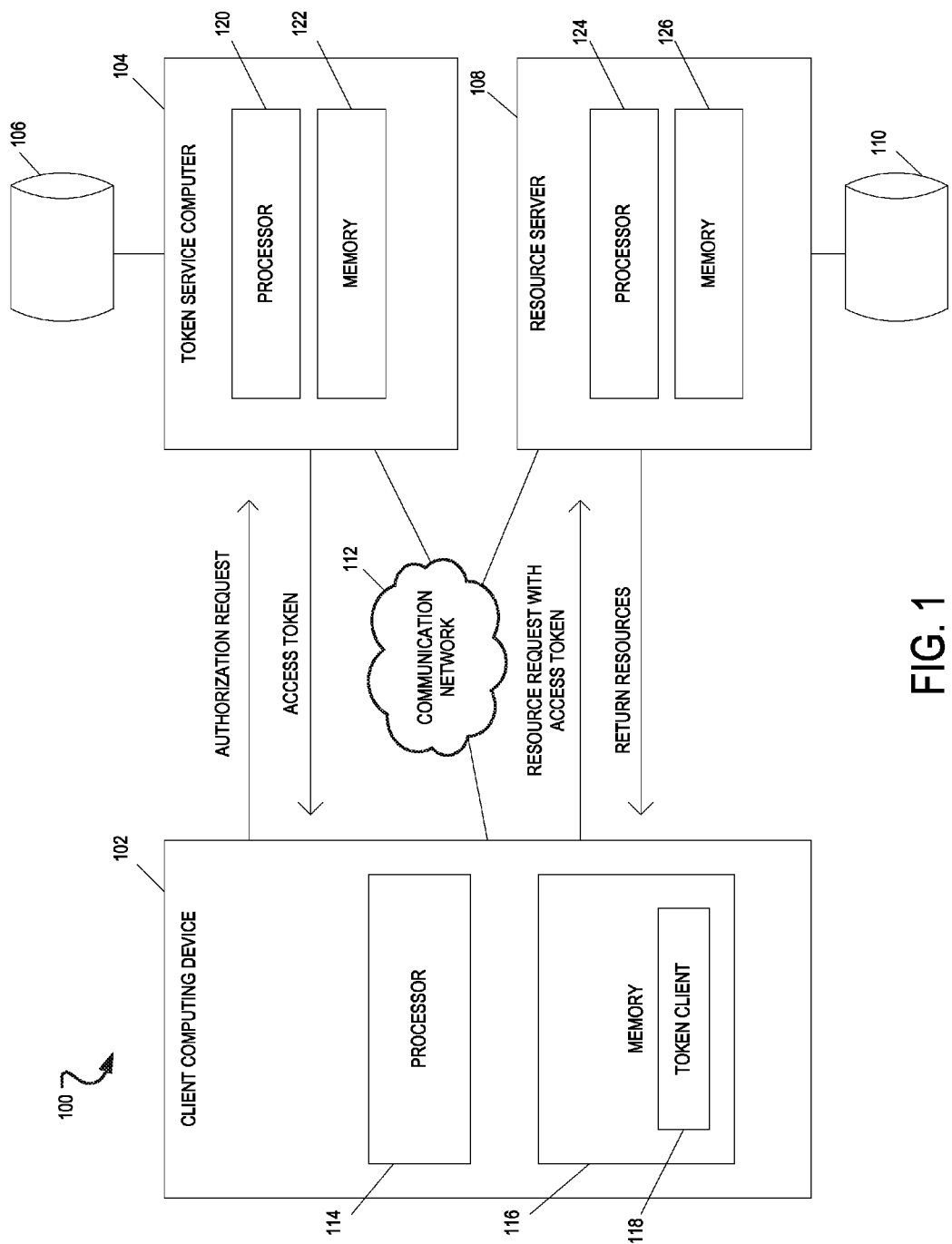
FIG. 1 is a block diagram of a token cache system according to an example embodiment.

For the purpose of promoting an understanding of the principles of the present disclosure, reference will now be made to the embodiments illustrated in the drawings, and specific language will be used to describe the same.

The present disclosure generally relates to token cache systems and methods. In particular, the embodiments relate to systems and methods for requesting access tokens from a token service computer, caching the access tokens and related information in a token cache, transmitting the access tokens with a resource request to a resource server, and receiving requested resources in response to the resource request. The resource server transmits representations of requested resources to computing devices having valid tokens. The access tokens and related information including credentials information and token metadata are stored in the token cache.

Before an application or service may access data from a web service, the application or service may obtain an access token that grants access to the data. Stated simply, the access token may represent security credentials and acts similarly to a valet key by granting limited access to a subset of data. Examples of web services include AMAZON WEB SERVICES™ (AWS™), SALESFORCE™, TWITTER™, FACEBOOK™, GOOGLE™, INSTAGRAM™, and PAYPAL™, among others. A single access token may grant varying degrees of access to the data based on user credentials and other factors. When a new access token is granted by a token service computer, the token service computer transmits the new access token to a client computing device executing the application or service. The client computing device caches the new access token in a token cache in addition to a representation of user credentials used to obtain the new access token and metadata that provides information associated with obtaining the new access token from the token service computer.

In a cloud or federated computer environment, the client computing device may have to obtain, cache, and utilize a large number of access tokens. The client computing device includes the token cache to effectively and securely store and manage the access tokens. In one example, the application or service may be an enterprise manager for testing, deploying, operating, monitoring, diagnosing, and resolving problems associated with one or more web services. The enterprise manager may be a portal that collects remotely distributed resources and presents a representation of the remotely distributed resources to users. The enterprise manager may be a consumer of one or more producers, e.g., web services having remotely distributed resources. As an example, the portal may request a status of each of the web services at a particular interval of time, e.g., every thirty minutes or every hour.

The token cache provides a secure storage for the client computing device to cache one or more access tokens, store access credentials associated with the one or more access tokens (e.g., a representation of a username and password such as a hash value based on the username and the password), and store metadata used for obtaining a new access token to replace an invalidated access token and/or expired access token. According to an exemplary embodiment, both the username and password are combined and hashed. The username and password are hashed for security purposes and also to maintain a minimal token cache footprint. Before sending a request to a web service, according to an exemplary embodiment, the token cache requests a username and a password from a user and hashes the username and password. The token cache compares this hashed username and password with the hashed username and password stored in the token cache. Thus, the token cache is able to determine whether to request a new token before sending the request to the web service. The metadata used for obtaining an access token is used to retrieve an access token when the access token expires or fails for another reason. If the metadata is not cached in the token cache, it may be necessary to obtain target metadata from a file system or storage and parse the target metadata. In most instances, the metadata does not change, and thus it is advantageous to cache the metadata in the token cache rather than obtain the target metadata from the file system and parse the target metadata each time it may be needed.

Although web services have proliferated, there is no standard for a provider to provide a web service and associated resources to consumers and client computing devices. In addition, there is no standard for protecting access to the resources provided by the web service. Although there is no standard for providing and accessing a web service and its resources, many web services use representational state transfer (REST). REST is a style of architecture that enables development of a computer system by using the hypertext transfer protocol (HTTP) protocol. Web services that adhere to REST are called RESTful web services. A RESTful web service having a request model may provide an application programming interface (API) that includes a uniform resource identifier (URI) for accessing resources, one or more internet media types for obtaining resources, e.g., extensible markup language (XML) or Javascript Object Notation (JSON), and standard HTTP methods for accessing, storing, modifying, and removing resources, e.g., GET, POST, PUT, DELETE. As an example, if a base URI is http://www.example.com/mgmt, resources may be available at http://www.example.com/mgmt/accounts/xyz and http://www.example.com/mgmt/servers/abc. An HTTP response may include an HTTP status code, a set of HTTP headers, and message content.

The following is an example XML schema that documents the request model:

```
<?xml version="1.0" encoding="UTF-8"?>
<xs:schema xmlns:xs="http://www.w3.org/2001/XMLSchema"
    xmlns:tns="http://..." targetNamespace="http://..."
    elementFormDefault="qualified">
  <xs:import namespace="http://www.w3.org/XML/1998/namespace" />
  <xs:element name="resource">
    <xs:complexType>
```

-continued

```
    <xs:sequence>
        <xs:choice minOccurs="0" maxOccurs="1">
            <xs:element ref="tns:method" />
            <xs:element ref="tns:resource" />
        </xs:choice>
    </xs:sequence>
    <xs:attribute name="path" type="xs:anyURI" />
    </xs:complexType>
</xs:element>
<xs:element name="method">
    <xs:complexType>
        <xs:sequence>
            <xs:element ref="tns:parameter" minOccurs="0" />
        </xs:sequence>
        <xs:attribute name="name" type="tns:HTTPMethod" />
        <xs:attribute name="type" type="xs:string" />
        <xs:attribute name="accept" type="xs:string" />
        <xs:attribute name="elementDefined" type="xs:boolean" />
    </xs:complexType>
</xs:element>
<xs:simpleType name="HTTPMethod">
    <xs:union memberTypes="tns:HTTPMethodName
        xs:NMTOKEN" />
</xs:simpleType>
<xs:simpleType name="HTTPMethodName">
    <xs:restriction base="xs:NMTOKEN">
        <xs:enumeration value="GET" />
        <xs:enumeration value="POST" />
        <xs:enumeration value="PUT" />
        <xs:enumeration value="HEAD" />
        <xs:enumeration value="DELETE" />
    </xs:restriction>
</xs:simpleType>
<xs:element name="parameter">
    <xs:complexType>
        <xs:attribute name="style" type="tns:ParameterStyle" />
        <xs:attribute name="name" type="xs:string" />
        <xs:attribute name="value" type="xs:string" />
    </xs:complexType>
</xs:element>
<xs:simpleType name="ParameterStyle">
    <xs:union memberTypes="tns:HttpParameterStyle
        xs:NMTOKEN" />
</xs:simpleType>
<xs:simpleType name="HttpParameterStyle">
    <xs:restriction base="xs:NMTOKEN">
        <xs:enumeration value="header" />
        <xs:enumeration value="matrix" />
        <xs:enumeration value="query" />
        <xs:enumeration value="template" />
    </xs:restriction>
</xs:simpleType>
</xs:schema>
```

Traditionally, web sites secured access to protected resources by requesting a username and a password from each user. Each user may be required to provide a valid username and password before receiving access to protected resources provided by a resource server. Often, the username and password would be provided with each request for resources by the user.

In another traditional example, RESTful web services provide client applications access to resources using access tokens. The access token may be generated by a resource server that provides the web services or another computer associated with the web services. In one embodiment, the resource server may be an authorization server. A client computing device may transmit a valid username and a valid password or a representation of the username and password to the authorization server or token service computer. In response, the authorization server may transmit a valid access token. The client computing device may transmit a resource request and the access token to the resource computer. In response, the resource computer may transmit a representation of the protected resources to the client computing device. In other words, the client computing device need not submit a username and password each time that the client computing device transmits a request for protected resources.

The authorization server verifies an entity's identity and determines what network resources an authenticated entity is allowed to access, e.g., read, write, modify, and/or delete. According to an example embodiment, an entity is authenticated using multi-factor authentication. The embodiments described herein may be based on Oauth, an open standard for authorization. Oauth allows producers of web services to grant third-party access to web resources without sharing usernames and/or passwords. Oauth provides one application with one access token providing access to a subset of web resources on behalf of one user, similar to a valet key. In particular, the embodiments may be related to Oauth 2.0. While discussed in the context of Oauth, the present disclosure is not limited to Oauth.

The embodiments described herein may also be related to Nimbula and/or WebCenter Authorization, e.g., idcTokens for Oracle Content Services. Similarly, Nimbula and WebCenter Authorization may provide one application with one access token providing access to a subset of web resources on behalf of one user, similar to the way a valet key provides limited access to a vehicle.

The following is an example Oauth2 access token response:

```
{
    "access_token": "2YotnFZFEjr1zCsicMWpaa",
    "token_type": example",
    "expires_in":3600,
    "example_parameter":"example_value"
}
```

The following is an example Nimbula token response:

```
HTTP 204
Date: Mon, 28 Oct 2013 22:41:07 GMT
Vary: Accept
Expires: Mon, 28 Oct 2013 22:41:07 GMT
Set-Cookie: nimbula={"identity": ...};
Path=/; Max-Age=3600
Content-Type:application/nimbula-v3+json
Connection: keep-alive
Server: nginx/1.1.1
```

The following is an example WebCenter Authorization idcToken response:

```
HTTP/1.1 200 OK
Cache-Control: no-cache
Date: Wed, 04 Sep 2013 18:42:26 GMT
Content-Length: 2152
Content-Type: application/json;
Charset=utf8
Set-Cookie: IntradocLoginState=1;
Path=/;
{
    "LocalData": {
    ....
    "dUserFullName": "weblogic",
    "idcToken":
    "1378492946768:816BB2B157FDAFE63196E540F3E8C204",
    "localizedForResponse": "1",
    ....
    },
    "ResultSets":{
    ....
    }
}
```

Although access tokens may eliminate the need to submit a username and password with each access request, use of access tokens may present other challenges and difficulties. As an example, the client computing device may have to maintain a large number of access tokens for use with a plurality of web services. Access tokens may be invalidated and/or expired for a variety of reasons including changes in the username and/or password and time-based usage restrictions placed on the access tokens. As a result, the client computing device maintains procedures and/or mechanisms to obtain new access tokens to replace the invalidated and/or expired access tokens.

Aspects of the present disclosure involve systems, methods, computer program products, and the like, for requesting access tokens from a token service computer, caching the access tokens and related information in a token cache, transmitting the access tokens with a resource request to a resource server, and receiving requested resources in response to the resource request. The systems, methods, and computer program products utilize the token cache comprising one or more access tokens and related information for obtaining network resources accessible on a communications network. The access tokens and related information including credentials information and token metadata are stored in the token cache.

To begin, a user using a client computing device is registered to use and access protected network resources. In one example, the user may create a username and password in order to access the network resources. After the user is registered, the client computing device caches authorization information and information used for obtaining the token. A token cache may be located in the client computing device, particularly, in memory of the client computing device. The authorization information may include a representation of credentials used to obtain the access token, e.g., a representation of a username and a password. In addition, the information used for obtaining the token may include metadata used for obtaining the access token.

The client computing device transmits the representation of a username and a password to a token service computer for validation by the token service computer. If the token service computer validates the username and the password, the token service computer generates a token which may include a time-to-live or an expiration time, to the computing device. After receiving the token, the client computing device may cache the token with the authorization information and the metadata (e.g., a URI) used for obtaining the access token. The client computing device may send a request for network resources including the token to a resource server. The resource server receives the request and the token, verifies that the token is valid, locates the network resources, and transmits a representation of the network resources to the computing device.

In certain instances, the access token may be invalidated and/or expired. In one example, a user associated with the client computing device may change user credentials, e.g., a username and/or a password associated with the access token and therefore the token becomes invalid. In another example, the access token may have reached the time-to-live and expired. Before the client computing device sends a request for network resources, the client computing device determines whether the user credentials have changed since the access token was created. The client computing device requests a username and a password from the user and determines a hash value based on the username and the password. The client computing device compares the hash value with the representation of the username and the password in the token cache, e.g., another hash value of valid versions of the username and password. If the username and the password are determined to be valid, then the access token is deemed to be valid. However, if the username or the password is not valid, the access token is no longer valid and the client computing device may obtain a new access token from the token service computer using the metadata for obtaining the access token. If the username and the password are determined to be valid but the access token has expired, the resource server notifies the client computing device that a new access token is needed. The client computing device uses the metadata for obtaining the access token and sends a request for a new access token to the token service computer to replace the invalidated and/or expired access token.

FIG. 1 illustrates a block diagram of a token cache system 100 according to an example embodiment. According to an aspect of the disclosure, the token cache system 100 includes one or more client computing devices 102. The token cache system 100 further comprises one or more token service computers 104, one or more token databases 106, one or more resource servers 108, one or more resource databases 110, and a communication network 112. The one or more computers communicate and coordinate their actions by passing messages over the communication network 112. The communication network 112 can be one or more of the Internet, an intranet, a cellular communications network, a WiFi network, a packet network, or another wired or wireless communication network. As an example, the one or more computers communicate data in packets, messages, or other communications using a common protocol, e.g., Hypertext Transfer Protocol (HTTP) and/or Hypertext Transfer Protocol Secure (HTTPS). As an example, the token cache system 100 may be a cloud-based computer system.

The one or more token databases 106 and one or more resource databases 110 each comprise an organized collection of data. The data in the token databases 106 may include one or more tables comprising token information, and username and password information, among other information. The data in the resource databases 110 may include one or more tables comprising token information, username and password information, photograph information, video information, media information, social network information, financial information, and retail store information, among other information. The information may be stored in a non-relational database and/or in a relational database. As an example, the information may be stored in a relational database management system (RDBMS) such as ORACLE DATABASE™, an open source distributed database management system such as a Not only SQL (NoSQL) database management system, an in-memory database (IMDB) management system, or another appropriate database management system.

FIG. 1 illustrates a block diagram of the client computing device 102 according to an example embodiment. The client computing device 102 may be a computer having a processor 114 and memory 116, including but not limited to a laptop, desktop, tablet computer, mobile computing device (e.g., a smartphone) or a dedicated electronic device having a processor and memory. The one or more processors 114 may process machine/computer-readable executable instructions and data, and the memory 116 may store machine/computer-readable executable instructions and data including one or more applications, including a token client 118. The processor 114 and memory 116 are hardware. The memory 116 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like.

The token client 118 may be a component of an application and/or service executable by the client computing device 102. For example, the token client 118 may be a single unit of deployable executable code. The application may be an email client, a social media application, a photograph application, a video application, a media application, an e-commerce application, a word processing application, a spreadsheet application, a portal monitoring application, and other applications. In a specific example, the application is a web-based application viewed in a browser on the client computing device and/or a native application executed by the client computer 102. In one example, the application may be downloaded from the Internet and/or digital distribution platforms, e.g., the App Store and/or GOOGLE PLAY™, among others. The token client 118 communicates messages with the token service computer 104 and the resource server 108.

In order to obtain access to protected resources associated with the resource server 108, the token client 118 may transmit a token request including a representation of the username and password to the token service computer 104 using hypertext transport protocol secure (HTTPS) and/or other protocols. The token request may be a representational state transfer (REST) and/or a Simple Object Access Protocol (SOAP) request. The token service computer 104 verifies the username and password and in response transmits an access token to the token client 118. The token service computer 104 may transmit a REST and/or SOAP response including the access token as Javascript Object Notation (JSON) and/or Extensible Markup Language (XML).

The username and password may be encrypted using secure sockets layer (SSL) and/or other encryption protocols. The username and password may be encrypted using a cryptographic hash function (e.g., SHA-1, MD5) to determine a hash-based message authentication code (HMAC) (hash-based message authentication code). In one example, "username.password" is encrypted using the cryptographic hash function. This cryptographic hash function allows the username and password to be verified and authenticated. The output of the cryptographic hash function is a binary string that may be encoded using Base64.

The token client 118 may transmit a request with the access token to the resource server 108. The request may be a REST and/or SOAP request sent to the resource server 108, which identifies particular resources. The resource server 108 determines what resources are associated and identified with the request and the resource server 108 transmits a REST and/or SOAP response of a representation of the resources as JSON and/or XML.

The client computing device 102 may further include an optional display and an optional input device. The display is used to display visual components of the application, such as at a user interface. In one example, the user interface may display the representation of the requested resources received from the resource server 108. The display can include a liquid-crystal display, a light-emitting diode display, a touch screen display, and other displays. The input device is used to interact with the application and may include a mouse, a keyboard, a trackpad, and/or the like. The input device may be included within the display if the display is a touch screen display. The input device allows a user of the client computing device 102 to manipulate the representation of the requested resources received from the resource server 108.

FIG. 1 also illustrates a block diagram of the token service computer 104 according to an example embodiment. The token service computer 104 may be a computer having a processor 120 and memory 122, including but not limited to a server, laptop, desktop, tablet computer, mobile computing device (e.g., a smartphone) or a dedicated electronic device having a processor and memory. The one or more processors 120 may process machine/computer-readable executable instructions and data, and the memory 122 may store machine/computer-readable executable instructions and data including one or more applications, including a token distribution application. The processor 120 and memory 122 are hardware. The memory 122 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like.

The token distribution application may be a software application for registering, authenticating, and authorizing client computing devices 102 to use and access network resources provided by the resource server 108. The token distribution application comprises machine/computer-readable executable instructions that are executed by the processor 120 or another processor. The token distribution application has access to the username and password information, and the token information that may be stored within the memory 122 and/or the database 106. As an example, the token distribution application may be stored in non-transitory memory.

The token service computer 104 includes computer readable media (CRM) on which the token distribution application is stored. The computer readable media may include volatile media, nonvolatile media, removable media, non-removable media, and/or another available medium that can be accessed by the processor 120. By way of example and not limitation, the computer readable media comprises computer storage media and communication media. Computer storage media includes non-transitory memory, volatile media, non-volatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

The token distribution application receives a username.password hash-based message authentication code from the client computing device 102 and verifies that the username.password hash-based message authentication code is valid using the memory 122 and/or the database 106. In one example, the memory 122 and/or the database 106 may include a copy of each username.password hash-based message authentication code associated with access to network resources.

If the hash-based message authentication code is valid, the token distribution application generates a token having an optional time to live or expiration time, e.g., two hours, and transmits the token to the client computing device 102. The token and/or token information representing the token and the distribution of the token is stored in the memory 122 and/or the database 106.

FIG. 1 illustrates a block diagram of the resource server 108 according to an example embodiment. The resource server 108 may be a computer having a processor 124 and memory 126, including but not limited to a server, laptop, desktop, tablet computer, mobile computing device (e.g., a smartphone) or a dedicated electronic device having a processor and memory. The one or more processors 124 may process machine/computer-readable executable instructions and data, and the memory 126 may store machine/computer-readable executable instructions and data including one or more applications, including a resource distribution application. The processor 124 and memory 126 are hardware. The memory 126 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like.

The resource server 108 includes computer readable media (CRM) on which the resource distribution application is stored. The computer readable media may include volatile media, nonvolatile media, removable media, non-removable media, and/or another available medium that can be accessed by the processor 124. By way of example and not limitation, the computer readable media comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

The resource server 108 receives a REST and/or SOAP request from a client computing device 102 and a token, and verifies that the token is valid using the token and/or the token information in the database 110. The resource server 108 determines what resources are associated and identified with the request and where the resources are located on the communication network 112. The resource server 108 transmits a REST and/or SOAP response of a representation of the resources as JSON and/or XML.

Figure 2:
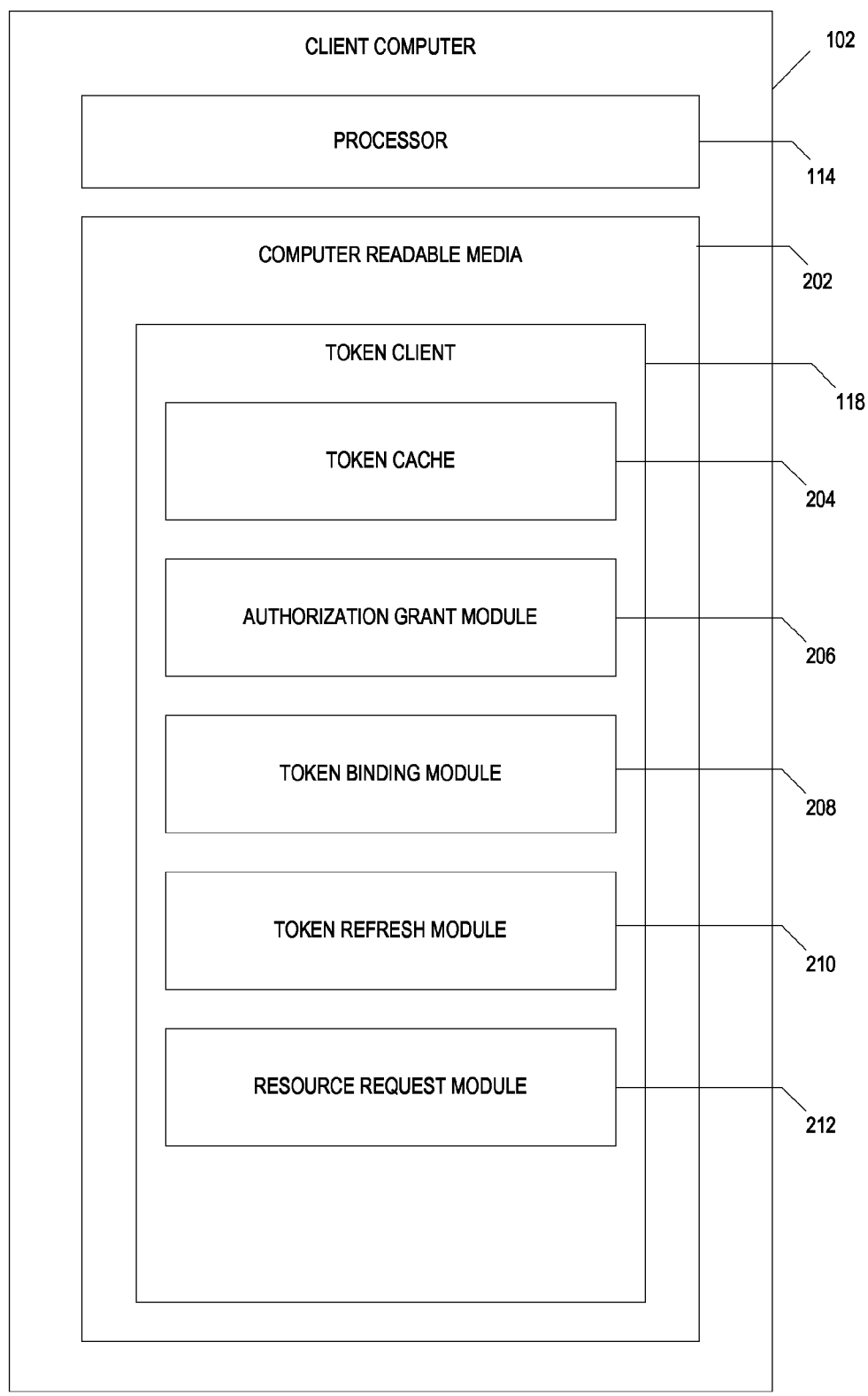
FIG. 2 is a block diagram of a client computing device having a token cache according to an example embodiment.

FIG. 2 illustrates another block diagram of the client computing device 102 according to an example embodiment. The client computer 102 includes computer readable media (CRM) 202 on which the token client 118 is stored. The computer readable media 202 may include volatile media, nonvolatile media, removable media, non-removable media, and/or another available medium that can be accessed by the processor 114. By way of example and not limitation, the computer readable media 202 comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

As shown in FIG. 2, the token client 118 includes a token cache 204 to store access tokens and associated data and information. The token cache 204 may be a key/value store, e.g., a hash table that maps keys to values and/or groups or objects having one or more values. A hash table uses a hash function to determine an index that indicates where the values are stored in memory. Each key may be assigned to one or more data values. In one example, the keys may be session identifiers (IDs). The token cache 204 may store one or more access tokens, one or more credential hash values, and one or more token metadata. The token client 116 further includes an authorization grant module 206, a token binding module 208, a token refresh module 210, and a resource request module 212, among others.

Access tokens may have different formats, structures, and methods of utilization (e.g., cryptographic properties) based on token service computer security procedures and practices. Generally, access tokens may represent an authorization issued to a user, the access tokens are opaque, the access tokens represent specific scopes and durations of access, and the access tokens and associated access to resources may be enforced by the token service computer 104 and the resource server 108.

The authorization grant module 206 obtains an access token from the token service computer 104 according to an example embodiment. The authorization grant module 206 determines whether the user has provided credential information and token metadata or a mechanism for obtaining the access token. If the user has not provided credential information and/or token metadata information, the authorization grant module 206 requests the credential information and/or the token metadata from the user. If the user has provided the credential information and the token metadata, the authorization grant module 206 generates an access token parameter map for determining where an access token is provided in a response from the token service computer 104. As an example, the access token parameter map may include [AccessToken=$.access_token][TokenType=$.token_type][Expire=$.expires_in].

The authorization grant module 206 transmits an access token request to the token service computer 104 including the credential information. The token service computer 104 verifies the credential information in the access token request and if the credential information is valid, transmits a response with an access token to the authorization grant module 206. The authorization grant module 206 retrieves the access token using the access token parameter map and stores the access token in the token cache 204. The access token may be extracted from the response. The access token may be included in an HTTP header, e.g., access_token=2YotnFZFEjr1zCsicMWpAA. The access token also may be included in an HTTP cookie, e.g., Cookie: access_token=2YotnFZFEjr1zCsicMWpAA; Max-Age=3600. In another example, the access token may be included as part of the message content in XML or JSON format. In order to selectively extract the token from the message content, the authorization grant module 206 uses the access token parameter map in combination with XPath and/or JSONPath.

XPath is the XML path language, e.g., a query language, for selecting nodes in an XML document. XPath also may be used to determine or extract values from content of an XML document without having to read and/or parse an entire XML document. The XPath language provides the ability to select nodes in the XML document. As an example, an XPath expression may be //access_token or //token_type. Similarly, JSONPath is the JSON path language, e.g., a query language, for selecting parts of a JSON document. JSONPath may be used to determine or extract values from the content of a JSON document without having to read and/or parse an entire JSON document. As an example, a JSONPath expression may be $.access_token or $.token_type.

The authorization grant module 206 supports one or more REST service properties including TokenServiceURL, ProxyHost, ProxyPort, RequestMetadata, RequestElementPayload, Authentication, SSLKeyStore, SSLTrustStore, SSLTrustServerCert, AccessTokenParameterMap, and AuthCredentialHandler. These service properties are used for properly invoking and submitting an authorization grant for an access token. The authorization grant module 206 instantiates a map object comprising AccessTokenParameterMap. These service properties are used to configure the authorization grant module 206 for submitting a request for an access token and retrieving the access token from a response to the request for the access token. As an example, the TokenServiceURL may be "http://www.example.com/mgmt/auth/token." ProxyHost may be "www-proxy.abc.com." ProxyPort may be 80. RequestMetadata may be the metadata of a request for a token in XML format and other formats. The RequestElementPayload may be the request element payload in XML or JSON format. Authentication may be a value for an authentication header. SSLKeyStore may be a keystore file location for two-way SSL. SSLTrustStore may be a truststore file location for one-way SSL. SSLTrustServerCert may be a boolean value related to whether there is a trust peer server certificate. AccessTokenParameterMap is described above and for determining where an access token is provided in a response from the token service computer 104. AuthCredentialHandler may be created at runtime to obtain credentials from the user. The AuthCredentialHandler may be used to obtain and store credentials and a hash-based message authentication code associated with the credentials.

Thus, the authorization grant module 206 is a module for transmitting an authorization request together with credentials to one or more token services and retrieving access tokens from responses using the access token parameter map.

According to an example embodiment, a request for protected resources includes an access token. The token binding module 208 binds an access token to the request for protected resources. The token binding module 208 may insert access token information into a cookie associated with the request, a header associated with the request (as regular token information and/or bearer token information), and/or a message body associated with the request, among others.

Example binding mechanisms include (1) cookie, (2) header, (3), bearer, and (4) message body. The cookie binding mechanism may be:
Insert into <Method>
The header binding mechanism may be:
Insert          into <Method>
The bearer binding mechanism may be:
Insert <Parameter style="header" name="Authorization" value="Bearer <AccessToken>"/>into <Method>
If the access request is one of HTTP POST or HTTP PUT, the message body binding mechanism may be:
Insert           <Parameter           style="query" name="<AccessTokenName>"
value="{AccessToken}"/> into <Method>
The message body binding mechanism also may be based on XPath and/or JSONPath. If the message body is in XML format, the token binding module 208 may use XPath to insert a token value into the message body. If the message body is in JSON format, the token binding module 208 may use a JSONPath to insert a token value into the message body. In other words, the token binding module 208 inserts the token value of the access token into the access request payload. The token binding module 208 produces an access request for protected resources comprising a map object including request metadata and the access request payload including the token value of the access token.

The token binding module 208 supports one or more REST service properties including AccessTokenName, AccessToken, BindingType, RequestMetadata, RequestElementPayload, Token PathExpr, and Binding Handler. These service properties may be used for properly invoking an access request with an access token. The token binding module 208 instantiates a map object comprising RequestMetadata and RequestElementPayload. At least one of the RequestMetadata and the RequestElementPayload may have the bound token.

AccessTokenName may be the access token name, e.g., access_token. AccessToken may be the characters associated with the access_token, e.g., 1234ABCD. BindingType may be one of a cookie binding type, a header binding type, a bearer binding type, and a message body binding type. RequestMetadata may be the metadata of a request including the access_token in XML format and other formats. RequestElementPayload may be the request element payload in XML or JSON format. TokenPathExpr may represent the XPath or JSONPath to specify the token position in the message body, e.g., $.LocalData.idcToken. BindingHandler may be a custom binding handler to invoke specific logic to bind a token to a request. This specific logic may be customized to support any token binding. When the custom handler is specified in the property BindingHandler, this may be instantiated at run time and invoked to execute the specific custom logic to bind an access token to the request.

Thus, the token binding module 208 is a module for binding an access token to a request for accessing protected resources. In addition to supporting binding types including cookie, HTTP header, bearer scheme, and message body, the token binding module supports customized token binding.

According to an example embodiment, a request for protected resources includes an access token, but the access token may be invalidated and/or expired. In these instances, the token refresh module 210 obtains a new access token. In other examples, the resource server 108 may provide an access token in addition to a response to a request for protected resources.

If the access token is invalidated and/or expired, the token refresh module 210 uses the token metadata to obtain a new access token. The access token may be invalidated if a username and/or password changes and/or may be expired if a time-to-live of the access token is reached. Before each request for protected resources, the token client 118 requests for a username and a password from the user. The token client 118 determines a hash value based on the username and password and compares the hash value to the hash value stored in the token cache 204. If the hash values are different, then it may be assumed that the username and/or password have changed. The token refresh module 210 uses the token metadata to present a request for a new access token to the token service computer 104 and generate an access token parameter map for determining where an access token is provided in a response from the token service computer 104. The token refresh module 210 transmits an access token request to the token service computer 104. The token service computer 104 verifies the credential information in the access token request and if the credential information is valid, transmits a response with an access token to the token refresh module 210. The token refresh module 210 retrieves the access token using the access token parameter map and stores the access token in the token cache 204.

According to another embodiment based on Oauth, the token refresh module 210 may follow the Oauth specification to refresh the access token. According to Oauth, a current token may be used to obtain a refreshed token. At a particular interval, the token refresh module 210 may execute in order to keep a session associated with the access token active. Thus, the Oauth access token may be used to access protected resources without interruption.

If the resource server 108 provides the access token in addition to the response to the request for protected resources, e.g., the resource server 108 piggybacks a refreshed token with the response to the request for protected resources, the token refresh module 210 retrieves the access token using the access token parameter map and stores the access token in the token cache 204.

The token refresh module 210 supports one or more REST service properties including TokenServiceURL, ProxyHost, ProxyPort, RequestMetadata, RequestElementPayload, Authentication, SSLKeyStore, SSLTrustStore, SSLTrustServerCert, RefreshedTokenParameterMap, AccessTokenParameterMap, AuthCredentialHandler, and RefreshRequestHandler. These service properties are used for properly invoking and submitting a refresh request for an access token. When a refresh request is submitted, the token refresh module 210 instantiates a map including a previously granted access token and additional parameters, a subset of the service properties, and another map including instructions for retrieving a refreshed access token and additional parameters from the response from the token service computer 104.

As an example, the TokenServiceURL may be "http://www.example.com/mgmt/auth/token." ProxyHost may be "www-proxy.abc.com." ProxyPort may be 80. RequestMetadata may be the metadata of a request for a token in XML format and other formats. RequestElementPayload may be the request element payload in XML or JSON format. Authentication may be a value for an authentication header, e.g., xndfzAxxff. SSLKeyStore may be a keystore file location for two-way SSL, e.g., /app/ssl/keystore.jks. SSLTrustStore may be a truststore file location for one-way SSL, e.g., /app/ssl/truststore.jks. SSLTrustServerCert may be a boolean value related to whether there is a trust peer server certificate. RefreshedTokenParameterMap is described above and for determining where an access token is provided in a response from the token service computer 104. As an example, the RefreshedTokenParameterMap may be [AccessToken=$.access_token][TokenType=$.token_type] [Expire=$.expires_in]. AccessTokenParameterMap may include a granted token and other token parameters that may be used for a refresh request. As an example, AccessTokenParameterMap may be [grant_type=refresh_token] [refresh_token=tGzv3JOkF0XG5QxTlKWIA]. AuthCredentialHandler may be created at runtime to obtain credentials from the user. The AuthCredentialHandler may be used to obtain and store credentials and a hash-based message authentication code associated with the credentials. RefreshRequestHandler provides a custom handler to build a refresh request. This custom handler provides a mechanism to construct a sophisticated and/or complicated token refresh request.

In combination with the token binding module 208, the resource request module 212 transmits a request for protected resources to the resource server 108 and receives the representation of the protected resources from the resource server 108. The resource request module 212 presents the representation of the protected resources to the token client 118 for use by the associated application and/or service. The resource request module 212 may include an optional user interface sub-module to provide a user interface on the display of the client computer 102. The user interface may present information associated with the representation of the protected resources.

The request may be a REST and/or a SOAP request sent to the resource server 108 that identifies particular resources. The request is received by the resource server 108. The resource server 108 determines what resources are associated and identified with the request and the resource server 108 transmits a REST and/or SOAP response of a representation of the resources as JSON and/or XML. When requesting resources, the resource request module 212 transmits the access token to the resource server 108 that is bound to the request by the token binding module 208. If the token is valid, the resource server 108 transmits a representation of the requested resources to the resource request module 212 and the resource request module 212 provides the representation of the requested resources to the user interface sub-module for display and interaction.

Figure 3:
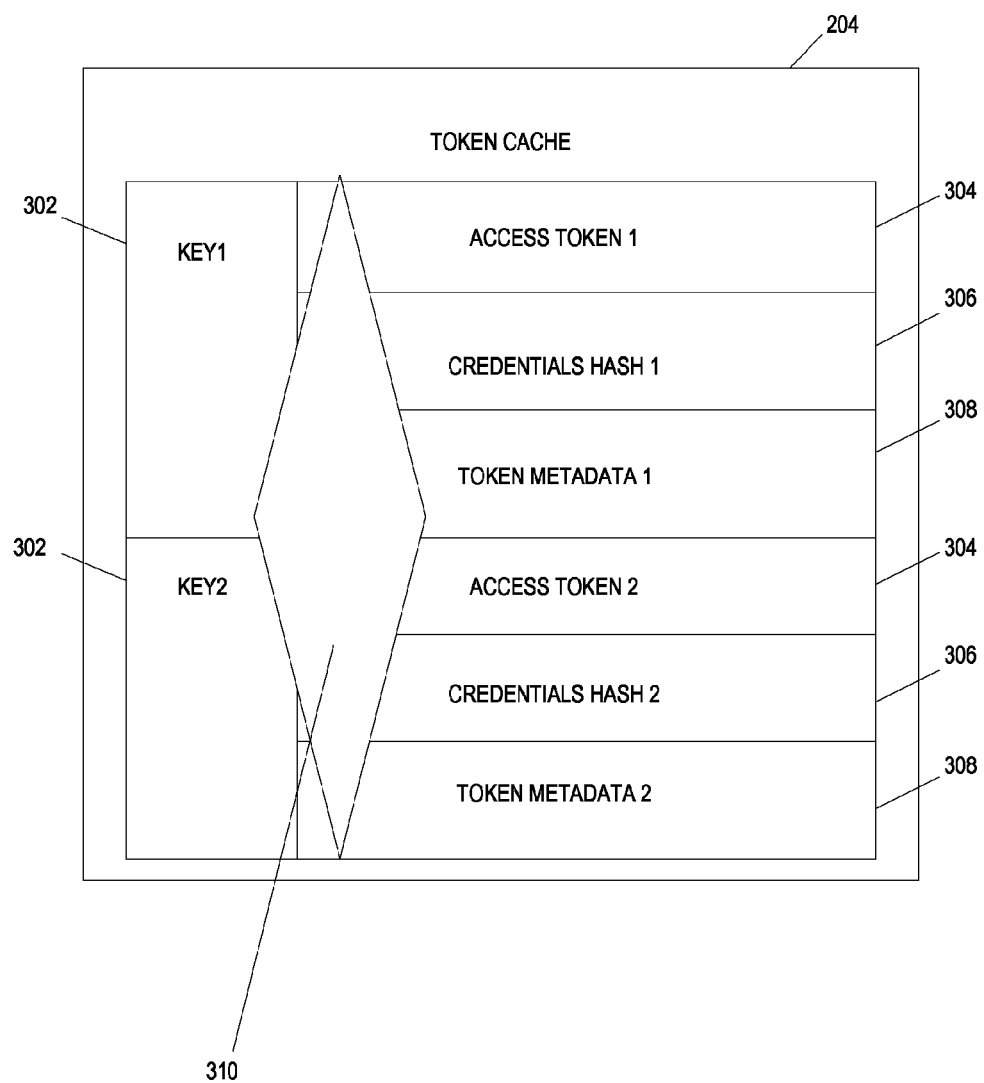
FIG. 3 is a block diagram of the token cache according to an example embodiment.

FIG. 3 illustrates a block diagram of the token cache 204 according to an example embodiment. According to an exemplary embodiment, the token cache 204 may be stored in transitory memory of the client computing device 102, e.g., RAM. As shown in FIG. 3, the token cache 204 stores one or more keys 302. The token cache also stores one or more access tokens 304, one or more credential hash values 306, and one or more token metadata 308. Each of the one or more keys 302 are mapped to one of the one or more access tokens 304, the one or more credential hash values 306, and the one or more token metadata 308 using a hash function 310.

In one example, the access token 304 may comprise a string of alphanumeric characters having a particular length, e.g., ABCD1234 or WXYZ5678, and other optional information. As an example, if the token cache 204 is being used for Oauth, the access token 304 may include a token string of characters, e.g., <token string>, and a token type, e.g., <bearer>. If the token cache 204 is being used for Nimbula, the access token 304 may include a token string of characters, e.g., <token string>, and an expire time in seconds, e.g., <time in seconds>. If the token cache 204 is being used for idcToken, the access token 304 may include a token string of characters, e.g., <token string>.

The credential hash values 306 may comprise a representation of a username and password, e.g., a hash value or a hash-based message authentication code of username.password. In one example, the credential hash value 306 may comprise a representation of johnsmith.mysecretpassword. As an example, if the token cache 204 is being used for Oauth, the credential hash values 306 may comprise a hash value of "<Consumer key>:<Consumer secret>." If the token cache 204 is being used for Nimbula, the credential hash values 306 may comprise a hash value of "<username>:<password>." If the token cache 204 is being used for idcToken, the credential hash values 306 may comprise a hash value of "<username>: <password>."

The token metadata 308 comprises information for obtaining an access token for use with a web service. In one example, the token metadata 308 may comprise one or more of the service parameters described herein, e.g., a token service universal resource locator (URL), metadata, payload information, token path expression information, and token parameter map information, among others. The token metadata 308 may be formatted by the token client 118 in an XML format or other formats. The token metadata 308 may be used to construct the access token parameter map that is used to extract an access token and other parameters from a response from the token resource computer 104. The access token parameter map indicates where the access token may be located in the response from the token resource computer 104. The access token may be provided in an HTTP header from the token resource computer 104, an HTTP cookie from the token resource computer 104 and/or message content from the token resource computer 104. The message content may be provided in XML, JSON, or other formats. The token metadata 308 may comprise an XPath expression for the access token if the access token is provided in XML, a JSON-Path expression if the access token is provided in JSON, and other information.

As an example, if the token cache 204 is being used for Oauth, the token metadata 308 may include RequestMetadata, an AuthCredentialHandler, an SSLTrustServerCert, a TokenServiceURL, a ProxyHost, a ProxyPort, and an AccessTokenParameterMap. The RequestMetadata may be <Resource path="/oauth2/token"> <Method elementDefined="true" type="application/x-www-form-urlencoded" name="POST"> </Method> </Resource>. The AuthCredentialHandler may be <TwitterCredentialHandler class name>. The TokenServiceURL may be https://api.twitter.com. The ProxyHost may be <proxy server>. The ProxyPort may be <proxy server port>. The AccessTokenParameterMap may be [AccessToken=$.access_token][TokenType=$.token_type].

If the token cache 204 is being used for Nimbula, the token metadata 308 may include RequestMetadata, an AuthCredentialHandler, a TokenServiceURL, an AccessTokenParameterMap, and an SSLTrustStore. The RequestMetadata may be <Resource path="/authenticate/"> <Method elementDefined="true" accept="application/nimbula-v3+json" type="application/nimbula-v3+json" name="POST"/> </Resource>. The AuthCredentialHandler may be <NimbulaCredentialHandler class name>. The TokenServiceURL may be <Nimbula token service URL>. The AccessTokenParameterMap may be [AccessToken=#Cookie.Name:nimbula] Expire=#Cookie.Max-Age:nimbula]. The SSLTrustStore may be <SSL truststore location>.

If the token cache 204 is being used for idcToken, the token metadata 308 may include RequestMetadata, an AuthCredentialHandler, a TokenServiceURL, and an AccessTokenParameterMap. The RequestMetadata may be <Resource path="/admin/cs/idcplg"><Method elementDefined="true" type="application/x-www-form-urlencoded" name="POST"> </Method> </Resource>. The AuthCredentialHandler may be <IdcCredentialHandler class name>. The TokenServiceURL may be <Idc Token service URL>. The AccessTokenParameterMap may be [AccessToken=$.LocalData. idcToken].

Figure 4:
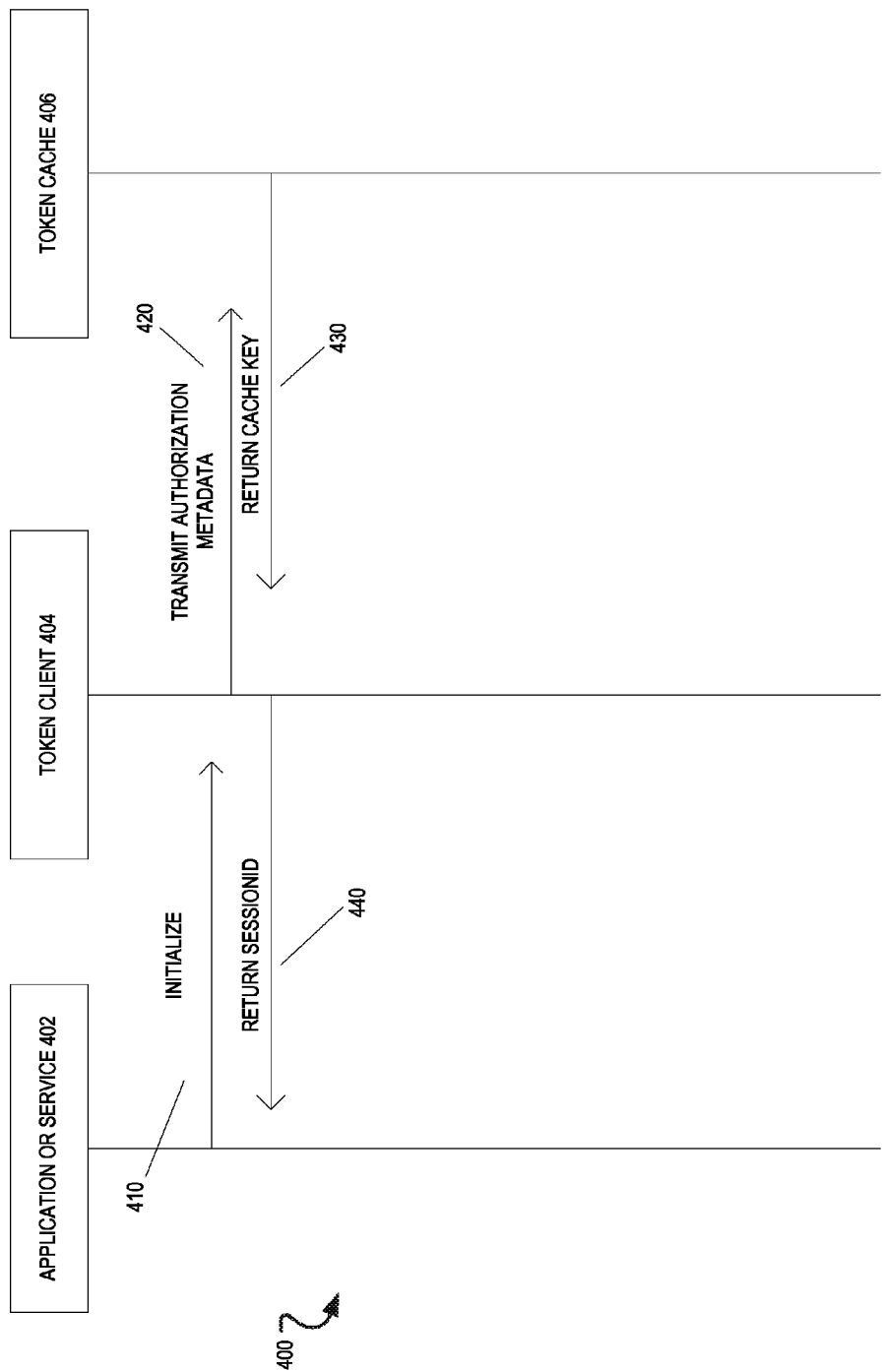
FIG. 4 is a flow diagram illustrating a method for initializing a client computing device to obtain an access token according to an example embodiment.

FIG. 4 is a flow diagram of a process 400 for initializing a client computing device session with a web service according to an example embodiment. In step 410, in response to an initialization request to access protected web resources associated with the web service, an application or service 402 transmits an initialization message to the token client 404. This initialization message includes token service authorization metadata that indicates how to send an authorization request and how to obtain an access token from a response from the token service computer 104.

In step 420, the token client 404 sends the authorization metadata to the token cache 406 for storage in the token cache. An entry is created in the token cache 406 to store the token service authorization metadata. In step 430, the token cache 406 provides the token client 404 with an associated token cache key. A session identifier (ID) associated with the web service may be mapped to the token cache key. In step 440, the session ID is provided by the token client 404 to the application or service 402.

Figure 5:
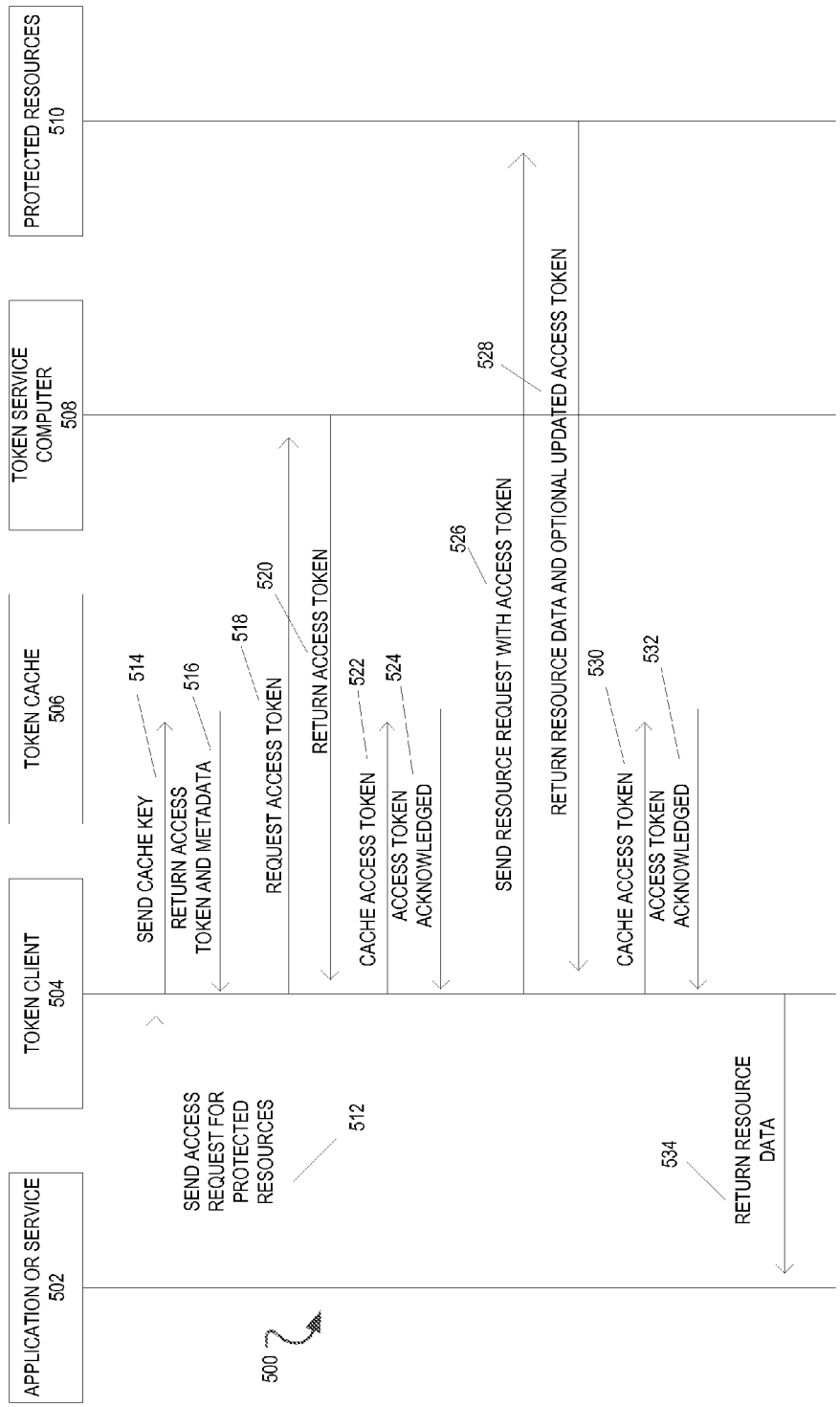
FIG. 5 is a flow diagram illustrating a method of accessing protected resources using the token cache according to an example embodiment.

FIG. 5 is a flow diagram of a process 500 for accessing protected resources associated with a web service provided by a resource server according to an example embodiment. In step 512, the application or service 502 sends an access request for protected resources to the token client 504. The access request includes a session ID that is mapped to a cache key. In step 514, the token client 504 sends the cache key to the token cache 506. In step 516, using the cache key, the token cache 506 provides a token metadata and may provide an access token if available in the token cache 506. If this is a first request for protected resources, in step 518, the token client 504 transmits a request for an access token to the token service computer 508. The token client 504 requests a username and a password from the user and performs the cryptographic hash function on username.password to determine a hash-based message authentication code of web service credentials. The token client 504 transmits the hash-based message authentication code of the web service credentials to the token service computer 508. The token service computer 508 compares the received hash-based message authentication code of the web service credentials with a copy of a hash-based message authentication code of the web service credentials. If the received hash-based message authentication code of the web service credentials is valid, in step 520, the token service computer 508 transmits a valid access token to the token client 504. In step 522, the token client 504 stores the access token in the token cache 506 by providing the cache key. In step 524, the token cache 506 acknowledges that the access token is stored in the token cache 506 by providing the token client 504 with an acknowledgement. Next, in step 526, the token client 504 transmits a resource request to the resource server with access to the protected resources 510. The resource request includes a copy of the access token that is bound to the resource request. If the access token is valid, in step 528, the resource server with access to the protected resources 510 transmits a representation of the requested resources to the token client 504. Optionally, in step 528, the resource server with access to the protected resources 510 and/or the token service computer 508 may transmit an updated or refreshed access token to the token client 504. If the response includes the updated access token, in step 530, the token client 504 stores the updated access token in the token cache 506. In step 532, the token cache 506 stores the updated access token and acknowledges to the token client 504 that the updated access token is stored in the token cache 506. In step 534, the token client 504 forwards the representation of the requested resources to the application or service 502.

Figure 6:
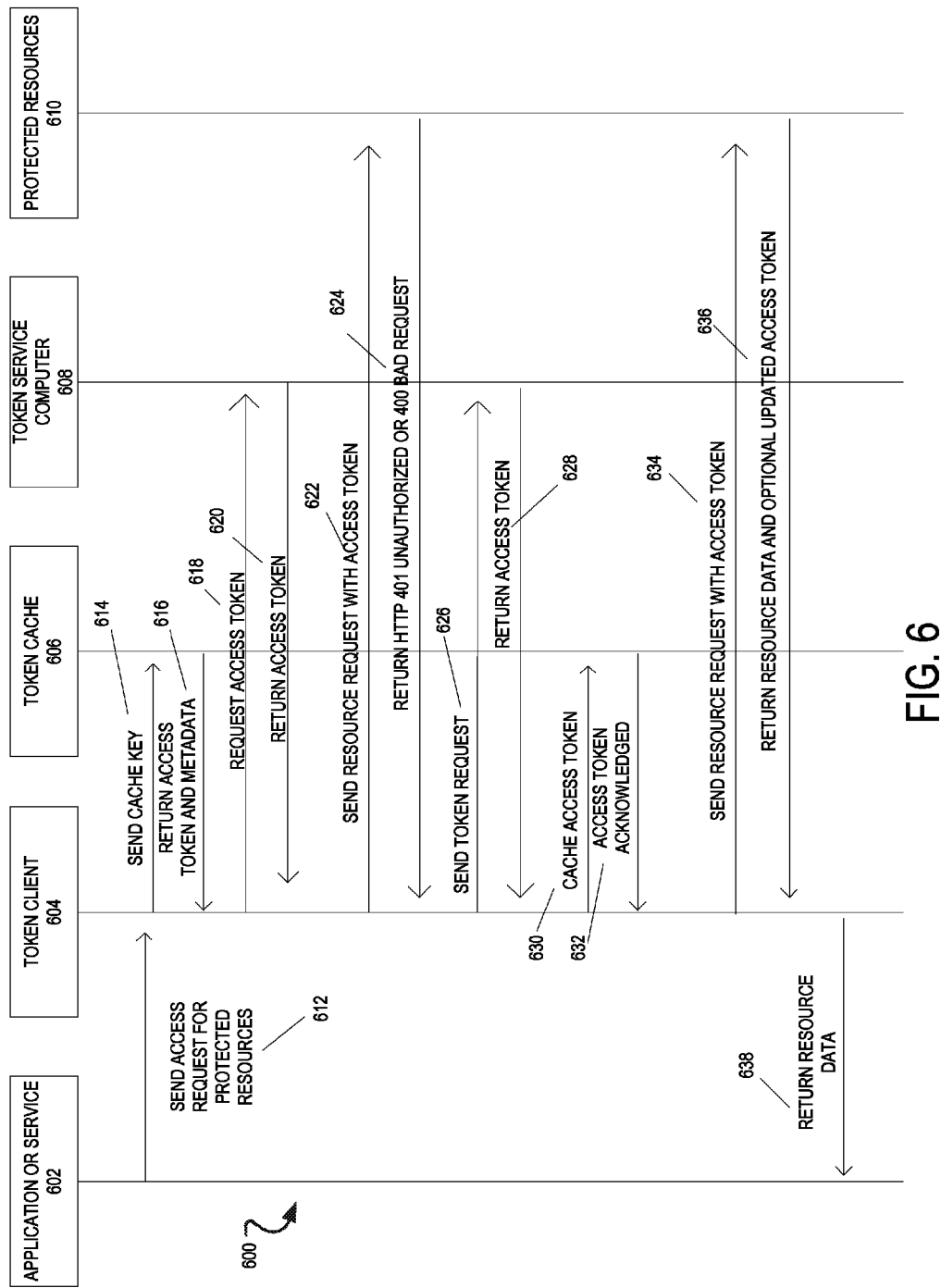
FIG. 6 is a flow diagram illustrating a method of refreshing an access token according to an example embodiment.

FIG. 6 is a flow diagram of a process 600 for refreshing an expired access token according to an example embodiment. In step 612, the application or service 602 sends an access request for protected resources to the token client 604 including the sessionID. In step 614, the token client 604 sends the cache key to the token cache 606 that is mapped to the sessionID. Using the cache key, in step 616, the token cache 606 provides a token metadata and may provide an access token to the token client 604. In one embodiment, the token client 604 requests a username and a password from the user, e.g., the web service credentials. The token client 604 receives the username and password from the user and performs a cryptographic hash function on username.password to determine a hash value of web service credentials. The token client 604 compares the hash value with the hash value stored in the token cache. If the hash values match, then this may imply that the user has not modified the username and/or the password and that the access token is valid. Next, in step 634, the token client 604 transmits a resource request to the resource server with access to the protected resources 610. The resource request includes a copy of the access token. If the access token is valid, in step 636, the resource server with access to the protected resources 610 transmits a representation of the requested resources to the token client 604. Optionally, in step 636, the resource server with access to the protected resources 610 may transmit an updated or refreshed access token to the token client 604. If the response includes the updated access token, the token client 604 stores the updated access token in the token cache 606. The token cache 606 stores the updated access token and acknowledges to the token client 604 that the updated access token is stored in the token cache 606. In step 638, the token client 604 forwards the representation of the requested resources to the application or service 602.

In another embodiment, if the hash values do not match, this may imply that the user may have updated the username and/or password since obtaining the access token stored in the token cache 606 and that the access token is no longer valid. In step 618, the token client 604 sends a request for a new token to the token service computer 508. The token client 604 transmits the hash value of the web service credentials to the token service computer 608. The token service computer 608 compares the received hash value of the web service credentials with a copy of a valid hash value of the web service credentials. If the received hash value of the web service credentials is valid, in step 620, the token service computer 608 transmits a valid access token to the token client 604. In step 630, the token client 604 may store the access token in the token cache 606 by providing the key. In step 632, the token cache 606 acknowledges that the access token is stored in the token cache 606 by providing an acknowledgement to the token client 604.

In another embodiment, the access token is expired, but the token client may not have access to this information. In step 622, the token client 604 transmits a resource request with the expired access token to the resource server with access to the protected resources 610. The resource server with access to the protected resources 610 receives the resource request and determines that the access token is expired. In step 624, the resource server with access to the protected resources 610 transmits an HTTP response of "401" or "400" to the token client 604. An HTTP response of 401 indicates that the resource request was unauthorized. An HTTP response of 400 indicates that the resource request was a bad request. Next, in step 626, the token client 604 transmits a request for an access token to the token service computer 608.

The token client 604 requests a username and a password from the user and performs a cryptographic hash function on username.password to determine a hash value of web service credentials. The token client 604 transmits the hash value of the web service credentials to the token service computer 608. The token service computer 608 compares the received hash value of the web service credentials with a copy of a valid hash value of the web service credentials. If the received hash value of the web service credentials is valid, in step 628, the token service computer 608 transmits a valid access token to the token client 604. In step 630, the token client 604 stores the access token in the token cache 606 by providing the cache key. In step 632, the token cache 606 acknowledges that the access token is stored in the token cache 606 by providing an acknowledgement to the token client 604. Next, in step 634, the token client 604 transmits another resource request to the resource server with access to the protected resources 610. The resource request includes a copy of the access token. If the access token is valid, in step 636, the resource server with access to the protected resources 610 transmits a representation of the requested resources to the token client 604. Optionally, in step 636, the resource server with access to the protected resources 610 may transmit an updated or refreshed access token to the token client 604. If the response includes the updated access token, the token client 604 stores the updated access token in the token cache 606. The token cache 606 stores the updated access token and acknowledges to the token client 604 that the updated access token is stored in the token cache 606. In step 638, the token client 604 forwards the representation of the requested resources to the application or service 602.

Figure 7:
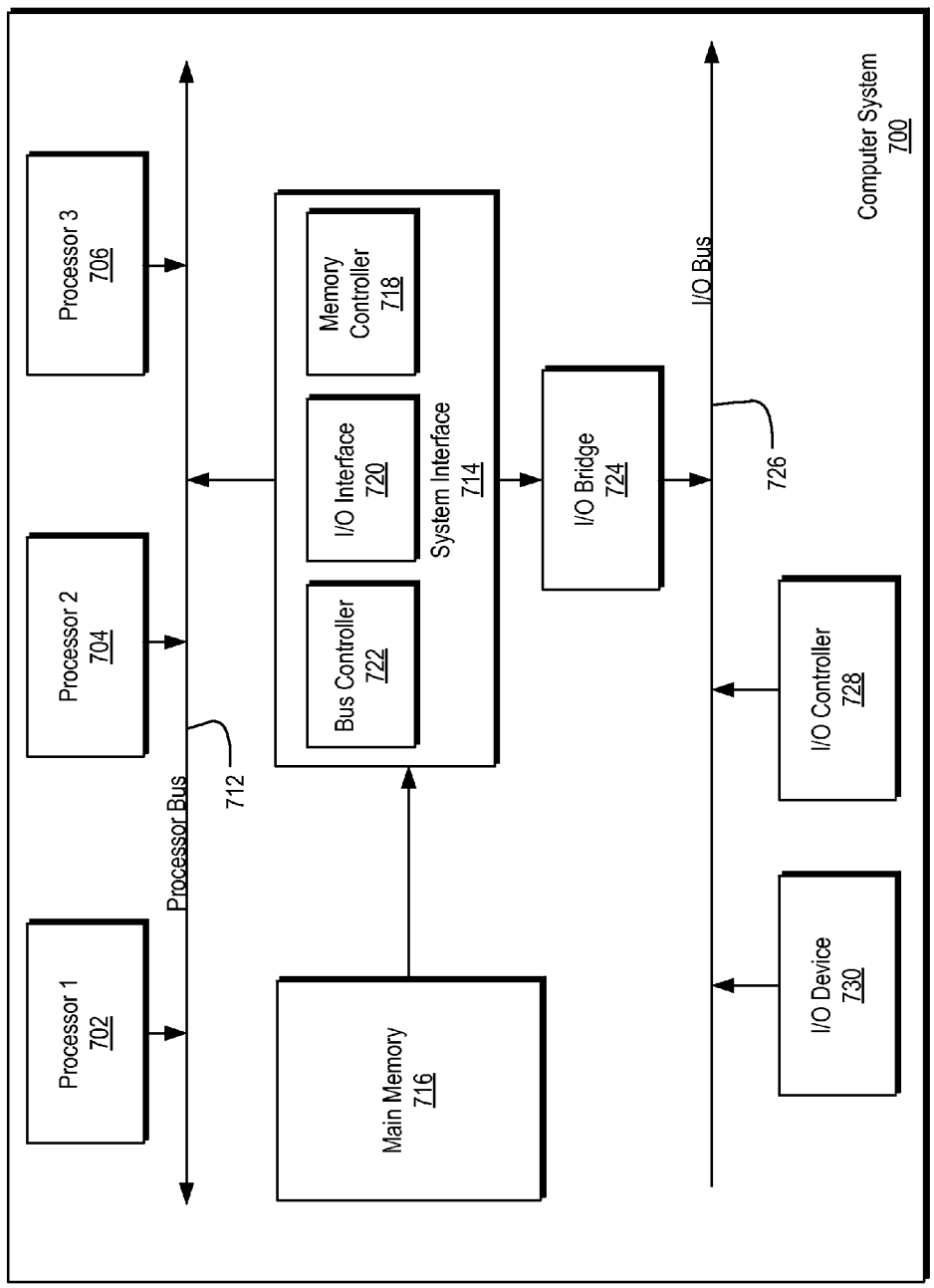
FIG. 7 is a diagram illustrating an example of a computing system which may be used in implementing embodiments of the present disclosure.

FIG. 7 is a block diagram illustrating an example of a computing device or computer system 700 which may be used in implementing the embodiments of the components of the network disclosed above. For example, the computing system 700 of FIG. 7 may be used to implement the various components of the token client 118, the token distribution application, and the resource distribution application discussed above. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 714 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 740, as illustrated.

I/O device 740 may also include an input device (not shown), such as an alphanumeric input device, including alphanumeric and other keys for communicating information and/or command selections to the processors 702-706. Another type of user input device includes cursor or input control, such as a touchscreen, a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A system, comprising:
at least one processor to:
send an initialization message from an application to a token client, the initialization message comprising credentials information and token metadata;
cache the credentials information and the token metadata in a token cache and return a session identifier that maps to a cache key to retrieve the token metadata and the credentials information, wherein the token metadata comprises at least one service property used for obtaining an access token from a token service;
send a first access token request based on the credentials information and the token metadata;
receive a first access token response and retrieve a first access token from the first access token response using the token metadata;
cache the first access token in the token cache by associating the first access token with the cache key;
send a resource request for protected resources;
receive a resource response from a resource server, the resource response having a representation of the protected resources;
send, based on the resource response, the representation of the protected resources;
send the first access token request to a token service computer;
receive the first access token response from the token service computer;
receive by the token client the resource response from the resource server, the resource response indicating that the resource request is one of an unauthorized request and a bad request;
send a second access token request to the token service computer based on the credentials information and the token metadata;
receive a second access token response from the token service computer and retrieving a second access token from the second access token response using the token metadata; and
cache the second access token in the token cache by associating the second access token with the cache key.

2. A method, comprising:
sending, by at least one processor, an initialization message from an application to a token client, the initialization message comprising credentials information and token metadata;
caching, by the at least one processor, the credentials information and the token metadata in a token cache and returning a session identifier that maps to a cache key to retrieve the token metadata and the credentials information, wherein the token metadata comprises at least one service property used for obtaining an access token from a token service;
sending, by the at least one processor, a first access token request based on the credentials information and the token metadata;
receiving, by the at least one processor, a first access token response and retrieving a first access token from the first access token response using the token metadata;
caching, by the at least one processor, the first access token in the token cache by associating the first access token with the cache key;
sending, by the at least one processor, a resource request for protected resources;
receiving, by the at least one processor, a resource response from a resource server, the resource response having a representation of the protected resources;
sending, based on the resource response, by the at least one processor, the representation of the protected resources;
sending the first access token request to a token service computer;
receiving the first access token response from the token service computer;
receiving by the token client the resource response from the resource server, the resource response indicating that the resource request is one of an unauthorized request and a bad request;
sending a second access token request to the token service computer based on the credentials information and the token metadata;
receiving a second access token response from the token service computer and retrieving a second access token from the second access token response using the token metadata; and
caching the second access token in the token cache by associating the second access token with the cache key.

3. The method of claim 2, further comprising:
receiving by the token client a second access token from the resource server in response to the resource request for protected resources;

retrieving the second access token using the token metadata; and caching the second access token in the token cache by associating the second access token with the cache key.

4. The method of claim 2, further comprising:

retrieving the first access token from a particular XPath expression within an extensible markup language (XML) document of the first access token response, wherein the XPath expression is associated with the at least one service property.

5. The method of claim 2, further comprising:

retrieving the first access token from a particular JSONPath expression within a Javascript Object Notation (JSON) document of the first access token response, wherein the JSONPath expression is associated with the at least one service property.

6. The method of claim 2, further comprising:

binding the first access token to a particular position in a body of the resource request using a particular XPath expression in an XML document, wherein the XPath expression is associated with the at least one service property.

7. The method of claim 2, further comprising:

binding the first access token to a particular position in a body of the resource request using a particular JSONPath expression in a JSON document, wherein the JSONPath expression is associated with the at least one service property.

8. The method of claim 2, further comprising:

executing a cryptographic hash function on the credentials information comprising a first username and a first password to obtain a first hash-based message authentication code;

receiving input comprising a second username and a second password and executing the cryptographic hash function on the second username and the second password to obtain a second hash-based message authentication code;

comparing the first hash-based message authentication code with the second hash-based message authentication code and determining that the credentials information is valid; and sending the resource request for protected resources having the first access token to the resource server.

9. The method of claim 2, wherein the token metadata is associated with a particular token service of a plurality of token services and includes at least one service property used for obtaining an access token from the particular token service.

10. The method of claim 2, wherein the token cache comprises a hash table stored in transitory memory and the application comprises a representational state transfer (REST)ful application.

11. The method of claim 2, wherein the first access token comprises one of an Oauth access token, a Nimbula access token, and a WebCenter Authorization access token that grants the application access to the protected resources.

12. A non-transitory computer-readable medium including instructions stored thereon that, when executed by at least one processor, cause the at least one processor to perform operations comprising:

sending an initialization message from an application to a token client, the initialization message comprising credentials information and token metadata;

caching the credentials information and the token metadata in a token cache and returning a session identifier that maps to a cache key to retrieve the token metadata and the credentials information, wherein the token metadata comprises at least one service property used for obtaining an access token from a token service;

sending a first access token request based on the credentials information and the token metadata;

receiving a first access token response and retrieving a first access token from the first access token response using the token metadata;

caching the first access token in the token cache by associating the first access token with the cache key;

sending a resource request for protected resources;

receiving a resource response from a resource server, the resource response having a representation of the protected resources; and sending, based on the resource response, the representation of the protected resources;

sending the first access token request to a token service computer;

receiving the first access token response from the token service computer;

receiving by the token client the resource response from the resource server, the resource response indicating that the resource request is one of an unauthorized request and a bad request;

sending a second access token request to the token service computer based on the credentials information and the token metadata;

receiving a second access token response from the token service computer and retrieving a second access token from the second access token response using the token metadata; and caching the second access token in the token cache by associating the second access token with the cache key.

13. The non-transitory computer-readable medium of claim 12, the operations further comprising:

receiving by the token client a second access token from the resource server in response to the resource request for protected resources;

retrieving the second access token using the token metadata; and caching the second access token in the token cache by associating the second access token with the cache key.

14. The non-transitory computer-readable medium of claim 12, the operations further comprising:

retrieving the first access token from a particular XPath expression within an Extensible Markup Language (XML) document of the first access token response, wherein the XPath expression is associated with the at least one service property.

15. The non-transitory computer-readable medium of claim 12, the operations further comprising:

retrieving the first access token from a particular JSONPath expression within a Javascript Object Notation (JSON) document of the first access token response, wherein the JSONPath expression is associated with the at least one service property.

16. The non-transitory computer-readable medium of claim 12, the operations further comprising:

binding the first access token to a particular position in a body of the resource request using a particular XPath expression in an XML document, wherein the XPath expression is associated with the at least one service property.

17. The non-transitory computer-readable medium of claim 12, the operations further comprising:

binding the first access token to a particular position in a body of the resource request using a particular JSON- Path expression in a JSON document, wherein the JSONPath expression is associated with the at least one service property.

18. The non-transitory computer-readable medium of claim 12, the operations further comprising:
   executing a cryptographic hash function on the credentials information comprising a first username and a first password to obtain a first hash-based message authentication code;
   receiving input comprising a second username and a second password and executing the cryptographic hash function on the second username and the second password to obtain a second hash-based message authentication code;
   comparing the first hash-based message authentication code with the second hash-based message authentication code and determining that the credentials information is valid; and
   sending the resource request for protected resources having the first access token to the resource server.

19. The non-transitory computer-readable medium of claim 12, wherein the token metadata is associated with a particular token service of a plurality of token services and includes at least one service property used for obtaining an access token from the particular token service.

20. The non-transitory computer-readable medium of claim 12, wherein the token cache comprises a hash table stored in transitory memory and the application comprises a representational state transfer (REST)ful application.

21. The non-transitory computer-readable medium of claim 12, wherein the first access token comprises one of an Oauth access token, a Nimbula access token, and a WebCenter Authorization access token that grants the application access to the protected resources.

* * * * *